United States Patent [19]

Jackson

[11] 3,864,739

[45] Feb. 4, 1975

[54] TAPE MOTION CONTROL IN AN INCREMENTING MAGNETIC TAPE TRANSPORT

[75] Inventor: Howard C. Jackson, Longmont, Colo.

[73] Assignee: International Business Machines Corporation, Armonk, N.Y.

[22] Filed: Aug. 24, 1973

[21] Appl. No.: 391,405

[52] U.S. Cl. ........................ 360/71, 242/184, 360/84

[51] Int. Cl. ........................ G11n 15/18, G11n 5/52

[58] Field of Search ............ 360/71, 72, 101, 83–85, 360/90–96; 242/182, 183, 184, 185

[56] References Cited

UNITED STATES PATENTS 2,952,010 9/1960 Demer et al. ........................ 242/185

*Assistant Examiner*—Robert S. Tupper
*Attorney, Agent, or Firm*—Joscelyn G. Cockburn

[57] ABSTRACT

In a rotating head magnetic tape transport, the tape is maintained stationary as the head sweeps a selected data track. A length of tape is buffered in a vacuum column between a supply spool and the rotating head station. A take-up spool on the opposite side of the head station is servo controlled to maintain proper head/track alignment and to periodically step the tape to an adjacent track. Changes in the tape radius on the take-up spool are compensated for by (1) a stop-lock source of motor energization whose magnitude is servo controlled by unbalance between the vacuum column force tending to pull the tape in one direction and the take-up spool motor torque tending to pull the tape in the opposite direction, and (2) a step modification network which responds to head/track alignment error caused by the variable tape radius on the take-up spool.

15 Claims, 11 Drawing Figures

TAPE MOTION CONTROL IN AN INCREMENTING MAGNETIC TAPE TRANSPORT

BACKGROUND AND SUMMARY OF THE INVENTION

This invention relates to the field of magnetic telegraphophones, and more specifically to magnetic tape units employing one or more rotating heads which record and/or reproduce machine-convertible information while moving in transducing relationship with a stationary magnetic web or tape, this information being oriented as magnetic domains to form information tracks which extend generally transverse to the longitudinal tape length.

Rotating head magnetic tape units are widely known. In one form a generally cylindrical mandrel or drum includes a rotating headwheel which carries one or more read/write heads. The magnetic tape engages the mandrel at one point, makes a helical wrap about at least a portion of the mandrel, and exits the mandrel at a point which is both axially and circumferentially spaced from the entrance point. The angle of helical tape wrap can vary in accordance with design choice, but is usually between 180° and 360°. The headwheel rotates so as to sweep its magnetic heads transversely across the tape. The angle at which the head enters and exits the tape may vary, in accordance with design choice, from slightly less than 90° to a small angle, such as 15°.

Another form of device is one wherein the headwheel is associated with a tape guiding structure which bends the tape transversely into an arcuate shape that conforms to the circumferential shape of the headwheel. In this device the tape travels in a generally straight line past the headwheel, and is transversely bent by the associated guides as it enters the headwheel area.

The present invention finds utility with either aforementioned type of device, and has been found particularly useful with the helical wrap device.

A major problem encountered in the aforementioned devices is that of establishing and maintaining accurate positional alignment between the path of the headwheel and the tape's data track. This is particularly true when a data track is written on one tape transport or unit and later read by another tape unit.

To facilitate servo control of the tape position, so as to maintain this head/track alignment, the tape is provided with one or more longitudinal servo tracks. These tracks function to identify the position at which the rotating head should enter and/or exit the tape in order for the head to trace the proper transverse path across the tape. The prior art teaches means whereby the rotating head itself, or alternatively a stationary head or heads, reads the servo track or tracks and provides a head/track alignment error signal which is then used to fine-position the tape to correct this positional error.

The stepping of the tape from one data track to an adjacent track requires that the take-up spool be rotated an incremental amount.

The step-distance by which the tape is moved is a function of both the angular distance through which the take-up spool rotates, and the tape radius thereon. The tape distance between adjacent data tracks is uniform throughout the entire tape length. However, if equal angular steps are made by the take-up spool, to access an adjacent track, positional error will occur as the tape radius on the take-up spool varies.

Once the tape has been stepped it must be held taut, as by maintaining the tape under tension. This is accomplished by the force exerted due to motor stop-lock energization and the force exerted by associated tape buffers. Unbalance in these forces causes the tape to creep away from the stop-lock position, and thereby produce stop-lock position error.

The present invention executes a requested tape-step and provides unique structural means, responsive to the particular take-up spool tape radius associated with that step, to adjust the take-up motor's stop-lock torque in order to prevent the above-mentioned creeping of the tape away from its stop-lock position, as well as to adjust the step distance which is executed between adjacent data tracks, such that the execution of a step, at any position along the length of tape, brings the rotating head into accurate alignment with the underlying tape's data track so that only minimum fine positioning is thereafter required.

More specifically, the present invention first executes the requested step. Once the step has been executed, the moving of the tape away from its stop-lock position is sensed and the take-up spool motor's stop-lock torque is adjusted to the proper magnitude. This torque is applied to the tape at the particular take-up spool radius associated with that step, and produces a force equal and opposite to the tape force derived from the vacuum column buffer. In addition, the execution of a step is effective to enable a network which is responsive to head/track alignment error. This network modifies the step request to an adjacent data track in accordance with the takeup spool tape radius information. This modification adaptively controls the length of the take-up spool's incremental stepping as the tape radius thereon varies.

The foregoing and other features and advantages of the invention will be apparent from the following more particular description of preferred embodiments of the invention, as illustrated in the accompanying drawing.

DESCRIPTION OF THE PREFERRED EMBODIMENTS

The present invention will be described in the environment of a rotating head magnetic tape unit. This general type of magnetic tape unit transduces data from a length of magnetic tape while the tape is stationary. Specifically, magnetic tape 10 (FIG. 3) includes a plurality of inclined data tracks 11, 12 which are swept by the rotating head while the tape is stationary. Once a given data track is transduced, that is, either written or read by the rotating head, the tape is incremented or stepped to an adjacent data track. By way of example, the tape path diagrammatically shown in FIG. 1 may be of the type disclosed in the co-pending application.

Figure 2:
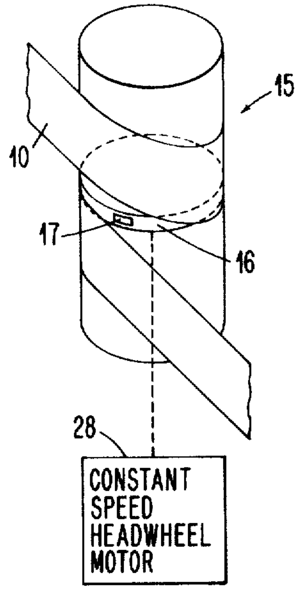
FIG. 2 is a view of the tape-wrap mandrel of FIG. 1, showing a helical wrap of tape thereabout, and showing the centrally located handwheel which carries a magnetic head or transducer.

While the present invention is described in the environment of a rotating head magnetic tape unit, and particularly the type wherein the tape forms a helical wrap about a mandrel having a centrally located headwheel, as shown in FIG. 2, the present invention is not to be restricted thereto. As is well known to those of skill in the art, a stationary length of magnetic tape may be transduced by a moving head, such as rotating head or, alternatively, by a head which does not require relative movement during transducing, such as a magnetorestrictive head.

Figure 1:
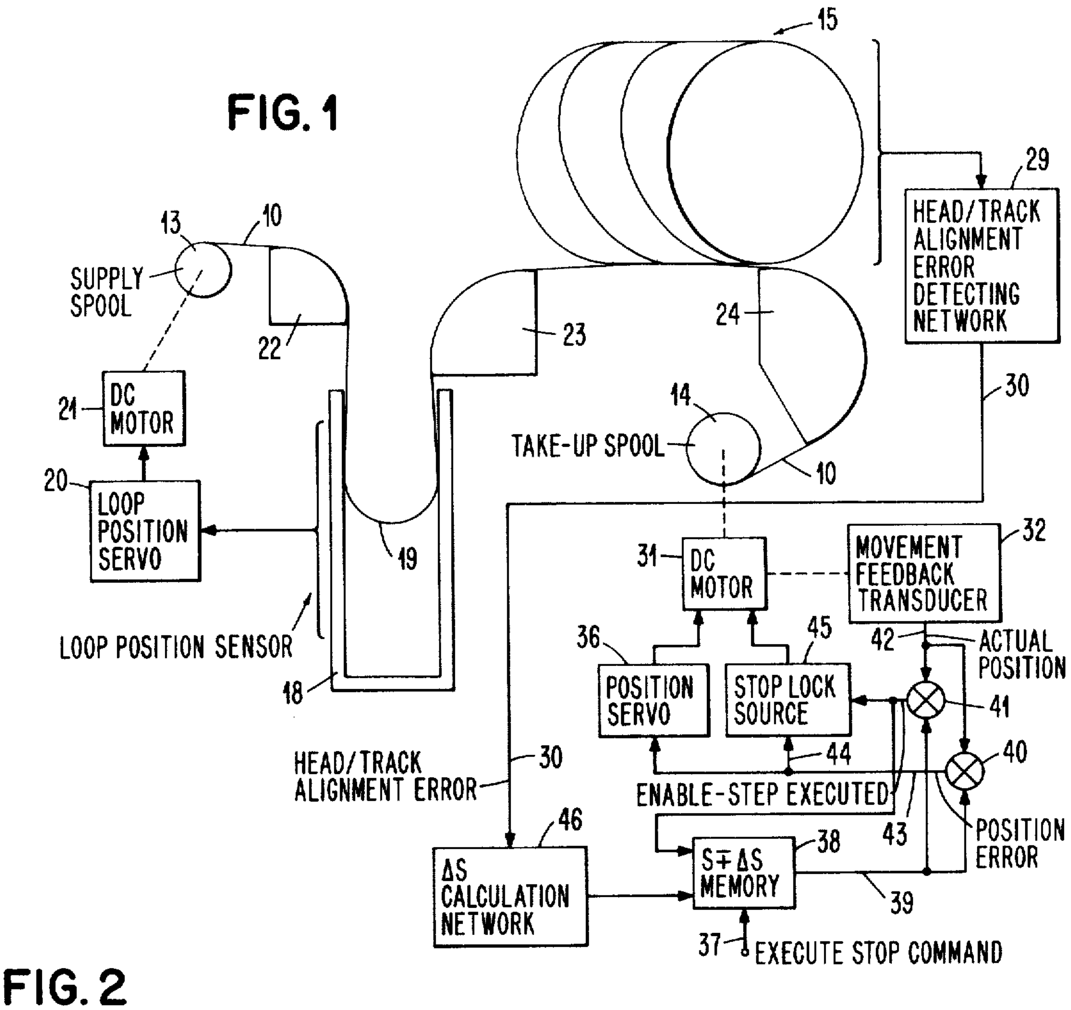
FIG. 1 is a view showing a rotating head magnetic tape unit whose take-up spool DC motor is controlled in accordance with the present invention.

With reference to FIG. 1, a length of magnetic tape 10 extends between supply spool 13 and take-up spool 14. The tape path extending between these two spools includes tranducing station 15 whereat a helical wrap of tape is formed about a stationary mandrel having a centrally located headwheel 16 carrying head 17, as more specifically shown in FIG. 2. This tape path includes a single tape buffer in the form of vacuum column 18. A loop of tape 19 is maintained in the vacuum column and its position is sensed by a loop position sensor, not shown. This loop position sensor, which may be of the type described in U.S. Pat. No. 3,122,332 to F. G. Hughes, Jr., provides an input signal to loop position servo 20 to control supply spool DC motor 21, thereby maintaining loop 19 at an optimum position as the tape moves in incremental step-by-step fashion from supply spool 13 to take-up spool 14.

A preferred magnetic transducer or head configuration to be used as head 17 of FIG. 2, useful in establishing a stable hydrodynamic air film at the head/tape interface, is described in the co-pending application of F. R. Freeman, W. R. Golz and W. K. Taylor, Ser. No. 318,973, now U.S. Pat. No. 3,821,813, filed Dec. 27, 1972 and commonly assigned.

As the tape passes through the tape path of FIG. 1, it is air-bearing supported at 22, 23 and 24. The side edges of the tape are preferably compliantly guided, particularly at air bearings 23 and 24. By way of example, this compliant guiding may be the continuous compliant guide described in the co-pending application of M. L. Nettles, Ser. No. 335,609, filed Feb. 26, 1973 and commonly assigned.

Figure 3:
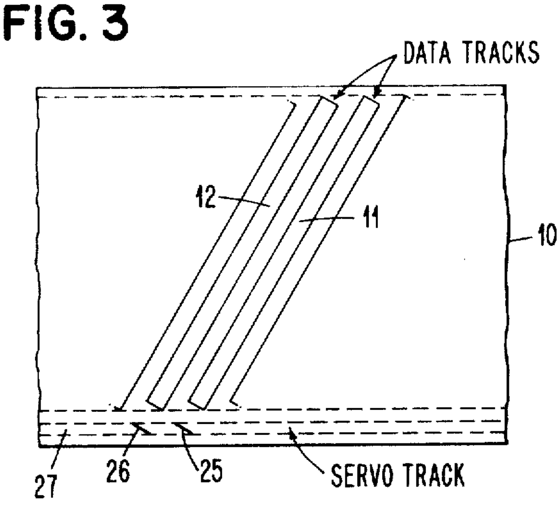
FIG. 3 is a view showing a flat section of tape, and diagrammatically showing two of the many transverse data tracks and the two individual servo track indicia which identify the physical location of these two data tracks.

FIG. 3 is a view showing a flat section of tape, such as the tape section shown in FIG. 2, wherein two of the many transverse data tracks and two specific servo track indicia 25 and 26 are shown. Indicia 25 and 26 reside in servo track 27 and serve to identify the centerline of the two data tracks 11 and 12, respectively. When the section of tape is properly positioned relative to the mandrel, headwheel 16 of FIG. 2 traverses a data track in exact alignment and coincidence therewith. Movement of head 17 is at a constant speed, as controlled by constant speed headwheel motor 28.

The exemplary showing of FIG. 3 is intended to be quite general since the particular data field formats used in data tracks 11 and 12 and in servo track 27 are not important to the present invention. Suffice it to say that head/track alignment error detection network 29 of FIG. 1 responds to the position of indicia 25 and 26 in servo track 27 to originate a head/track alignment error on conductor 30. The details of network 29 are not disclosed since this network may take many forms, in accordance, for example, with the format of servo track 27. Furthermore, such a network may receive its input information either from a stationary head which reads the tape's servo track 27, or alternatively, this servo track may be read by the rotating head itself as it enters and/or leaves the tape. Examples of acceptable networks of this type can be found in the co-pending application of G. A. Hart et al., Ser. No. 311,087, filed Dec. 1, 1972 and commonly assigned; U.S. Pat. No. 3,666,897, issued on May 30, 1972, to J. D. Harr; and the co-pending application of W. S. Buslik et al., Ser. No. 254,669, filed May 18, 1972 and commonly assigned.

Figure 4:
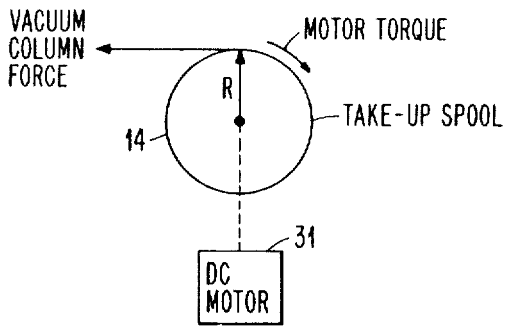
FIG. 4 is a view of the take-up spool of FIG. 1 and is useful in explaining the manner in which an unbalance in the take-up motor's stoplock torque and the vacuum column force tends to cause the tape to creep off the desired stop-lock or track position.

Turning for the moment to FIG. 4, this figure is useful in explaining the manner in which the tape adjacent transducing station 15 is maintained in a stable stop-lock position when the stop-lock torque of motor 31 is adjusted as a function of the variable tape radius on spool 14. As will be appreciated by those of skill in the art, vacuum column 18 maintains a substantially constant force on the left-hand end of the tape section passing through processing station 15. This force is in a direction to pull the tape to the left, removing it from the transducing station. This force is transmitted to spool 14 and tends to rotate this spool in a counterclockwise direction. The stop-lock torque of motor 31 is in a direction tending to produce clockwise rotation of spool 14. This torque is applied at a variable radius R, depending upon the quantity of tape wrapped about spool 14. Thus, in order for the length of tape traveling through processing station 15 to remain at a stable stoplock, position, the motor torque, applied to the tape at a radius R, must be equal and opposite to the vacuum column force.

Figure 5:
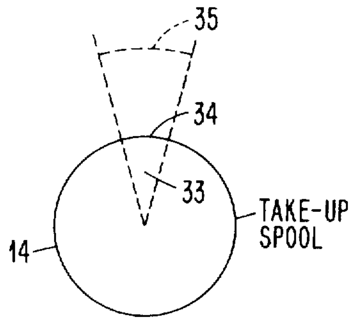
FIG. 5 is a view of the take-up spool of FIG. 1 and is useful in explaining the manner in which a unit rotation of the take-up spool produces a tape step distance at the rotating head which is dependent upon the take-up spool's tape radius.

FIG. 5 is useful in explaining a second variable phenomenon associated with variable tape radius on take-up spool 14. Rotational units of movement of motor 31 and spool 14 are sensed by movement feedback transducer 32, FIG. 1. In the preferred embodiment of the present invention, this transducer is a digital transducer which provides an output pulse for each unit of rotation of motor 31 and spool 14. In FIG. 5, this unit of rotation is identified by reference numeral 33. As can be seen from this figure, the tape moves a smaller step distance when the tape radius is at 34 than it will when a greater wrap of tape exists on spool 14, such as indicated at 35. The proportions in FIG. 5 have been exaggerated for clarity. Normally, distance 33 is much smaller than that indicated and, in fact, transducer 32 in the digital form may provide as many as 500 to 1,000 increment pulses for one 360° rotation of spool 14.

Turning again to FIG. 1, the function of the servo apparatus associated with take-up spool 14 is to step the tape incrementally, such that one data track is replaced by an adjacent data track, in alignment with rotating headwheel 16 of FIG. 2. Furthermore, the alignment between the tape data track and the head is servo controlled and stabilized.

Figure 6:
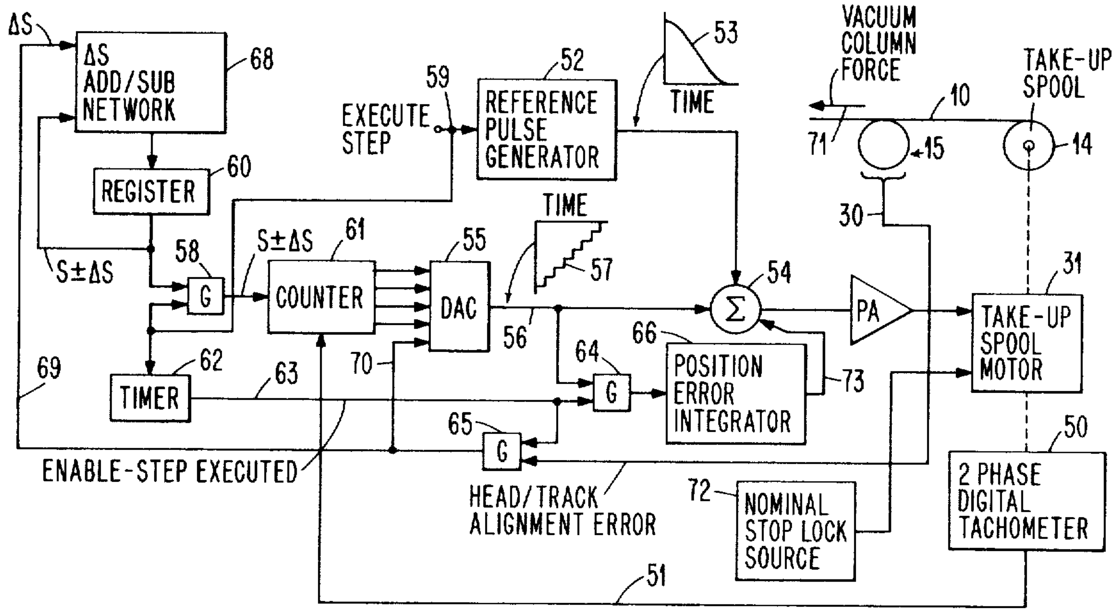
FIG. 6 is a schematic showing of a further embodiment of the present invention.

More specifically, the head/track alignment is maintained by a servomechanism which energizes DC motor 31 and operates to provide fine control of the tape's position. Such a network is not disclosed in FIG. 1 and may, for example, take the form disclosed in the two above-mentioned co-pending applications or U.s. Pat. No. 3,666,897. Also, the embodiment of the present invention disclosed in FIG. 6 provides such a means to fine position the tape as a result of head/track alignment error 30.

As has been mentioned, servo control of motor 31 functions to increment or step the tape one data track at a time. Gross tape movement is controlled by position servo 36 which receives position feedback information derived from transducer 32. After the initial gross step is executed, fine tape positioning is achieved by using the output of network 29. The input signal to this network is derived from the tape's servo track 27, as this servo track is read by rotating head 17.

When a command is received to move to the next data track, input conductor 37 is enabled. As a result, network 38 is effective to place a command step distance by means of conductor 39 to summing terminals 40 and 41. The magnitude of the step command is designated $S\pm\Delta S$. This magnitude is determined in a unique manner by operation of the present invention, as will be apparent.

A second input to junctions 40 and 41 appears on conductor 42 and is provided by the output of transducer 32. Junction 40 is effective to compare the actual motor position, on conductor 42, to the command position on conductor 39. As a result of this comparison, a position error signal appears on conductor 43. This position error signal is applied as an input to position servo 36, thereby energizing DC motor 31 in a manner to reduce this error to zero.

Summing junction 41 also responds to the discrepancy between the motor's actual position and the command position. This junction is effective to enable stop-lock source 45 and memory network 38 only when the position error has been reduced substantially to zero, this state indicating that position servo 36 has completed the execution of a requested tape step. Once stop-lock source 45 is enabled, it is thereafter effective to maintain motor 31 at a stable stopped position. The torque of this motor now resists the force of vacuum column 18 tending to pull tape through transducing station 15 and off spool 14. In addition, network 38 is enabled to begin the calculation of a new $S\pm\Delta S$ to be used in a subsequent step.

Considering first the operation of stop-lock source 45, once this source is enabled, it receives control input information by way of conductor 44. Should there be an inequality between the force applied to the tape from vacuum column 18 and the force applied by the stop-lock torque of motor 31, the tape will tend to creep away from the desired stop-lock position. This movement results in a position error signal appearing on conductor 43. This position error signal controls position servo 36 to return the tape to its desired stop position. This signal also controls the magnitude of stop-lock source 45 such that the stop-lock torque of motor 31 is increased or decreased, as necessary. For example, should there be a tendency for vacuum column 18 to cause take-up spool 14 to rotate in a counterclockwise direction, the sense of the position error signal will be such as to increase the magnitude of stop-lock source 45, thereby increasing the stop-lock torque of motor 31 and resulting in a balance between this tape force and the vacuum column's tape force.

Considering now the operation of head/track alignment error detection network 29, the completion of the requested tape step enables memory network 38. Thereafter, this network responds to any misalignment which may exist between the track of head 17 and the new data track. If the executed step S±ΔS was of the proper magnitude, exact coincidence will exist between the head track and the data track, and no head/track alignment error signal will exist on conductor 30. However, if slight misalignment occurs, this misalignment is detected by $\Delta S$ calculation network 46. This network now computes a new $\Delta S$ which is added to or subtracted from the prior $S\pm\Delta S$ executed step. Note that $S\pm\Delta S$ is defined in terms as units of motor rotation, rather than tape length. Thus, as is readily apparent from the above description of FIG. 5, the actual step movement of the tape for a given step movement of rotation of motor 31 is directly related to the tape radius wrapped about the take-up spool. That is, the greater the radius the greater the length of tape step. Network 46 facilitates the adaptive definition of a motor step length such that substantially exact coincidence is effected between the head track and the data track at the end of an executed step. This results from the fact that memory 38 at all times contains an updated definition of the motor's step distance, a new step being defined at the end of every step execution.

FIG. 6 is a schematic showing of a further embodiment of the present invention wherein motor 31 is servo controlled to maintain spool 14 at a stable stop-lock position and to execute an $S\pm\Delta S$ step which results in substantially coincidence between transducing station 15 and the desired tape data track or field.

In this embodiment, movement of motor 31 and spool 14 is detected or transduced by two-phase digital tachometer 50 whose output signal appears on conductor 51 as a pulse for every unit of rotational movement, this output bearing both distance and direction information.

When a command is received to move the tape to the next adjacent data track, conductor 59 becomes active. Conductor 59 enables reference pulse generator 52. The output of pulse generator 52 is as exemplified by curve 53. This signal is applied to summing junction 54 where it is summed with the output of digital-to-analog converter (DAC) 55 appearing on conductor 56. DAC 55 responds to position feedback information present on conductor 51 and provides an output waveform generally similar to that represented by curve 57.

The request to execute a step also enables gate 58, by way of conductor 59. When gate 58 is enabled, the $S\pm\Delta S$ content of register 60 is transferred to counter 61, causing this counter to increment or count up. The magnitude contained in register 60 is the quantity $S\pm\Delta S$ discussed in relation to memory 38 of FIG. 1.

The magnitude of this count establishes the instantaneous magnitude of the DAC output 56 at the instant that an execute step command is received. As a result of closed-loop servo operation, the output of DAC 55 substantially follows the step profile defined by curve 53. As motor 31 moves, the feedback information present on conductor 51 causes counter 61 to count down. At the end of the requested step execution, the output of counter 61 is substantially zero.

Conductor 59 enables timer 62 when a step is requested. At the end of the time interval, normally slightly less than a full revolution of headwheel 16, conductor 63 enables gates 64 and 65. With gate 64 enabled, the output of DAC 55 is connected to position error integrator 66. With gate 65 enabled, any head/track alignment error which exists at the end of the executed step is applied as a $\Delta S$ quantity to $\Delta S$ add/subtract network 68, by way of conductor 69.

In addition, fine positioning of tape 10 is achieved by way of conductor 70. This conductor applies any head/track alignment error on conductor 30 to the input of DAC 55, thereby causing fine positioning of spool 14 in order to produce the required exact coincidence between the path of headwheel 16 and the new data track.

During the time of this fine positioning, network 68 is computing a $\Delta S$ quantity which is either added to or subtracted from the previous $S\pm\Delta S$ executed step contained in register 60.

Figure 11:
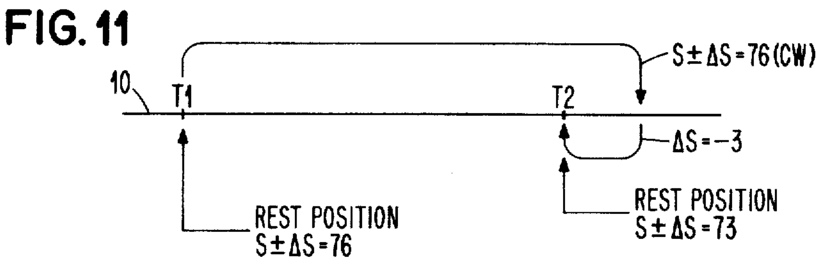
FIG. 11 is a movement diagram showing an example of a step which was too long, requiring a minus delta tape movement step, and resulting in a new step calculation for the next step.

With reference to FIG. 11, assume that the tape is initially at rest at the position identified as T1 and that the executed step $S\pm\Delta S$ is equal to 76 pulses from tachometer 50. In the example shown, the position of the adjacent track T2 has been overshot, and a $\Delta S$ movement of −3 tachometer pulses is necessary to fine position the tape to bring track T2 into exact coincidence with headwheel 16. At this time register 60 contains the count of 76. The $\Delta S$ quantity on conductor 69 is 3. Network 68 is now effective to subtract the quantity 3 from the $S\pm\Delta S$ quantity in register 60. As a result, the content of register 60 changes to the quantity 73. This quantity 73 designates the length of the step to be executed to the next adjacent tape track, the next time an execute step command is received.

Now that tape 10 has been properly positioned, if vacuum column force 71 is not exactly balanced by the stop-lock torque of motor 31, tape 10 will tend to creep away from the desired stop-lock position. In the structure of FIG. 6 a nominal stop-lock source 72 of constant magnitude is applied to motor 31. Integrator 66 is adaptively effective to increase or decrease the stop-lock torque of motor 31 to produce the required balance in forces on the length of tape passing through transducing station 15. More specifically, a tendency of the tape to creep away from the desired stop-lock position results in rotation of tachometer 50. As a result of this rotation, a count is entered into counter 61 and an output appears from DAC 55. This output is integrated by integrator 66 and an output appears on conductor 73. This output is summed with the output of source 72 to control the stop-lock energization of motor 31. For example, should the stop-lock energization of motor 31 be too large at the end of an executed step, reel 14 will rotate counterclockwise. As a result, the output of DAC 55 is integrated by integrator 66 to produce a voltage on conductor 73 which is opposite in polarity to that of source 72. The stop-lock energization of motor 31 is thereby reduced. In addition, the output of DAC 55 is effective to reposition motor 31 to the desired rest position, reducing the count in counter 61 to zero. The tape is now repositioned at the desired position with lower stop-lock energization of motor 31, and the tape is stabilized in this condition.

Figure 7:
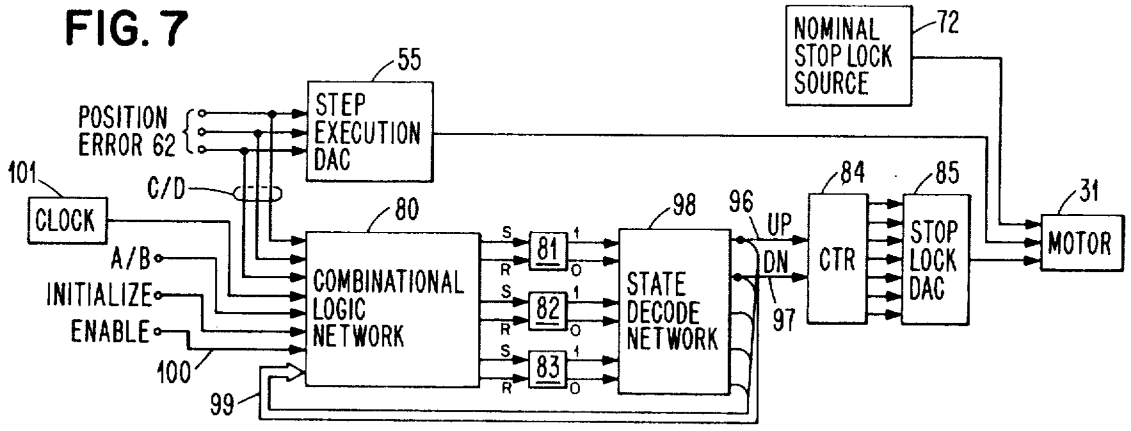
FIG. 7 shows a digital integration network which functions as the integrator of FIG. 6 to adjust the stoplock torque in accordance with the spool's tape radius.

FIG. 7 shows a digital integration network which functions much as integrator 66 of FIG. 6. In this figure, DAC 55 has been designated by the legend step execution DAC. This DAC receives binary position error input 62, as from counter 61 of FIG. 6. The output of DAC 55 energizes motor 31, usually by way of a power amplifier, not shown. Nominal stop-lock source 72 provides a steady-state fixed polarity energization of motor 31. In the structure of FIG. 7, combinational logic network 80 is sensitive to the operational status of the magnetic tape unit and to the status of bistable latches 81, 82 and 83. A binary number resides in counter 84 which is effectively an integration of the tendency of the tape to move away from the desired stop-lock position, this tendency resulting from an inequality between the motor's stoplock torque and the force of the vacuum column. The content of counter 84 controls stop-lock DAC 85 to thereby energize motor 31 in a manner to readjust its stop-lock torque to the required value.

Figure 8:
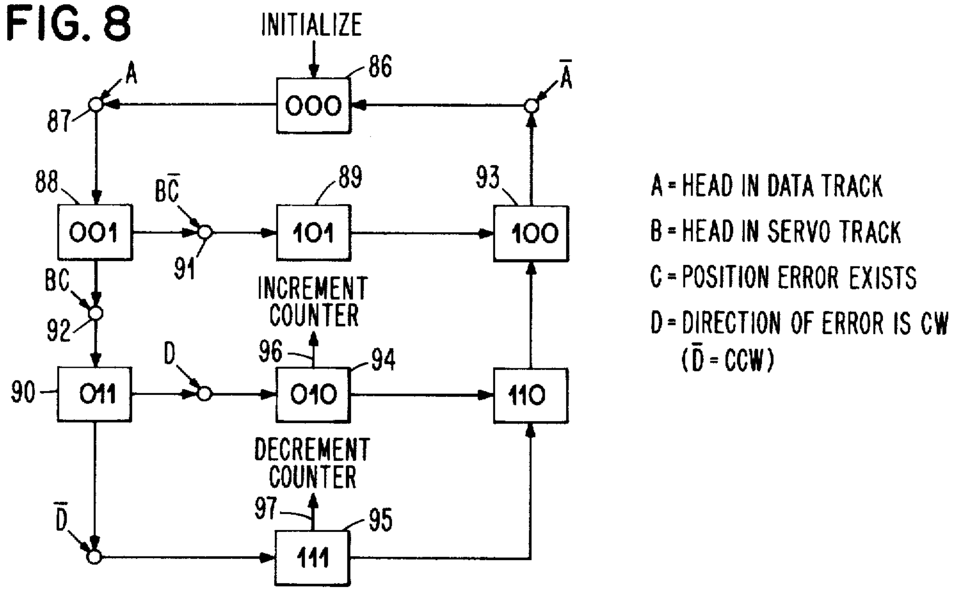
FIG. 8 is a state diagram useful in explaining the operation of the network of FIG. 7.

FIG. 8 is a state diagram useful in explaining the operation of the network of FIG. 7. State 86 defines the binary 000 state of latches 81, 82 and 83. The network of FIG. 7 is initialized to this state at the beginning of a period of operation.

When condition 87 occurs, the three latches move to state 88, namely binary 001. The transition from state 86 to state 88 occurs when combinational logic network 80 receives synchronizing information from headwheel 16 indicating that the headwheel is in the tape's data track area. Subsequently, the three latches may move to state 89 or 90, depending upon the conditions defined at 91 and 92. Both of these conditions require that the synchronizing information received by logic network 80 indicate that the head is in the servo track area. If the tape has moved away from the desired stop-lock position, a position error exists and the latches are moved to state 90, namely binary 011. However, if no position error exists, namely, the execution of the step has produced a stable stop-lock state, the three latches pass through states 89 and 93 to state 86.

Assuming that a position error does in fact exist, then one of the states 94 or 95 is entered, dependent upon the direction of this position error. If the error is in a clockwise direction, counter 84 is incremented by conductor 96, whereas if the direction of error is counterclockwise, the counter is decremented by conductor 97.

The binary state of latches 81, 82 and 83 is decoded by state decode network 98 and is applied as an input to network 80 by way of conductors 99. As with the previous embodiments of the present invention, network 80 is disabled by conductor 100 while a step is being executed. In addition, the apparatus of FIG. 7 is clocked to step through the state diagram of FIG. 8 by means of clock 101.

Figure 9:
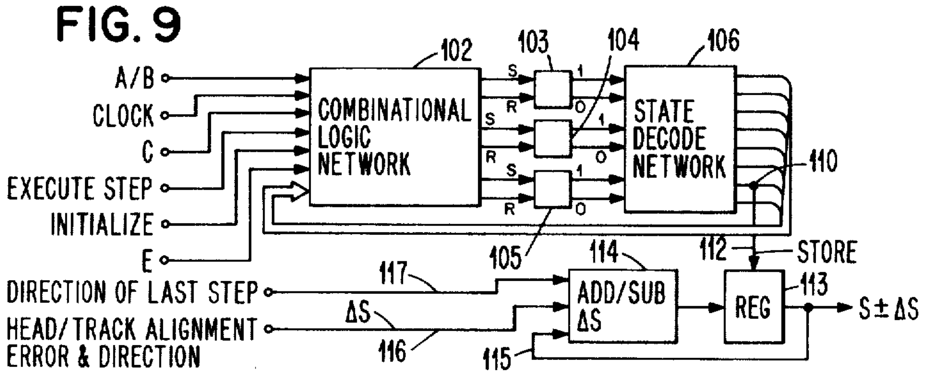
FIG. 9 shows a digital network which functions as the portion of FIG. 6 which functions to adjust the take-up spool's rotational step distance in accordance with the spool's tape radius.
Figure 10:
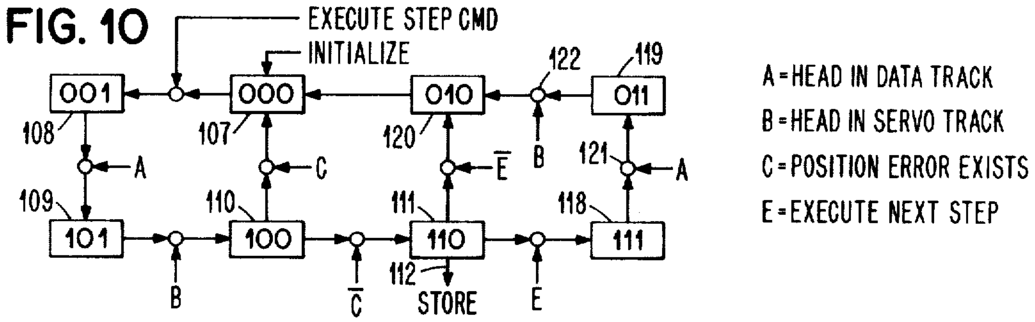
FIG. 10 is a state diagram useful in explaining the operation of the network of FIG. 9.

FIG. 9 shows a digital network which functions similar to register 60 and network 68 of FIG. 6 as a step modifying network to adjust the take-up spool's rotational step distance in accordance with the spool's tape radius. FIG. 10 is a state diagram useful in explaining operation of FIG. 9.

A portion of the structure of FIG. 9 is generally similar to the structure of FIG. 7 in that combinational logic network 102 functions with three bistable latches 103, 104 and 105 and state decode network 106. With reference to FIG. 10, the three latches are initialized to the binary 000 state 107 at the beginning of machine operation. Thereafter, the latches move to state 108 upon receiving an execute step command. Transition to state 109 requires that head synchronizing data from headwheel 16 indicate that head 17 is in the tape's data track area. Thereafter, the latches make a transition to state 110 when synchronizing information indicates that the head is in the servo track area. If a position error exists, indicating that head/track alignment error should be ignored since the tape has not been positioned properly, the three latches pass from state 110 to state 107. However, if the tape is properly positioned, the latches pass to binary 110, identified as state 111. When the latches are in this state, conductor 112 is effective to control register 113 in a manner to cause this register to store the $S\pm\Delta S$ contents of network 114. The content of network 114 is equal to the magnitude of the just executed $S\pm\Delta S$ step, on conductor 115, and the $\Delta S$ error quantity on conductor 116. This $\Delta S$ quantity is a function of the magnitude of the head/track alignment error sensed by head 17 reading the tape's servo track. The direction of this error is compared to the direction of the just executed step to determine if the $\Delta S$ quantity should be added to or subtracted from the just executed step magnitude $S\pm\Delta S$ on conductor 115. This new step command distance is stored in register 113 for use when the next execute step command is received. The new quantity $S\pm\Delta S$ contained in register 113 is calculated to produce a step providing substantially exact coincidence between the path of headwheel 17 and the next adjacent tape data track.

Should a new command to execute a step exist before the network of FIG. 9 has had time to compute a new $S\pm\Delta S$ quantity, the latches of FIG. 9 enter state 118 and a delay is provided by way of states 119 and 120. This delay is associated with rotation of headwheel 17 and the headwheel synchronizing signals required by conditions 121 and 122 to insure that this new step is executed before the three latches enter the 107 state. As a result of this delayed operation, no new $S\pm\Delta S$ calculation is made and the old $S\pm\Delta S$ content of register 13 is used for two successive steps.

While the invention has been particularly shown and described with reference to preferred embodiments thereof, it will be understood by those skilled in the art that various changes in form and details may be made therein without departing from the spirit and scope of the invention.

What is claimed is:

1. An incremental tape transport and rotary head magnetic tape unit, comprising:

a tape take-up spool and a motor connected to rotate the same, a tape supply, a rotating head cooperating with a length of tape running between said tape supply and said take-up spool to trace a track across said tape, said tape having a plurality of data tracks spaced at intervals and having servo indicia for at least certain tracks, reading means operable to read said servo indicia to identify misalignment of said head trace with its data track, means generating a tape step command, a position servo controlled by said step command and operable to energize said take-up motor to execute a requested step rotation of said tape take-up spool, said rotation resulting in a change in the tape radius at said tape take-up spool so that the tape moves a distance at least as great as one data track in response to said step command, alignment detection means responsive to said reading means and operable to detect misalignment of said head trace and said data track after completion of the requested step and to originate an alignment error signal representing misalignment of said head trace and said data track, and step modifying means operable to modify a subsequent step command in accordance with said alignment error signal which exists after execution of the requested step, said modification resulting in reduced alignment error after the execution of a subsequent step command.

2. The magnetic tape unit defined in claim 1, including:

a tape buffer maintaining a quantity of tape between said tape supply and said rotating head, a movement detection transducer connected to be driven by said take-up motor and operable to provide position feedback to said position servo, and motor stop-lock power supply means controlled by said movement detection transducer and responsive to movement of said motor which occurs after execution of the requested step to variably stop-lock energize said motor in a manner to equally oppose the tape tension produced by said tape buffer.

3. The magnetic tape unit defined in claim 2 wherein said alignment detection means includes said rotating head operable to read said servo indicia after an execution of the requested step, to thereby originate said alignment error signal.

4. In combination:

a tape take-up spool and a motor connected to rotate the same, a tape supply, a tape buffer buffering a quantity of magnetic tape as the tape extends from said supply to said takeup spool, a movement transducer connected to be driven by said take-up motor, and providing an output indicative of the rotational distance moved by said tape take-up spool a magnetic transducer cooperating with the length of tape extending between said tape buffer and said take-up spool, and transducing the tape while said tape is relatively stationary, said tape having a plurality of spaced data fields and having servo indicia for at least certain of said data fields, means generating a tape step command, a position servo controlled by said step command and the output of said movement transduucer, and operable to energize said take-up motor to execute step rotation of said tape take-up spool, said rotation resulting in a change in the tape radius at said tape take-up spool so that the tape moves a distance at least as great as one data field in response to said step command, said servo indicia being operable to identify desired stop positions for said tape adjacent said magnetic transducer, means operable to read said servo indicia when a step has been executed and to originate an alignment error signal representing misalignment of said desired stop positions and said magnetic transducer, and step modification means controlled by said alignment error signal and operable to modify a subsequent step command in accordance therewith, said modification resulting in a reduced alignment error signal after a subsequent step rotation of said take-up spool.

5. The combination defined in claim 4 including:

stop-lock power supply means for said takeup motor controlled by tape movement which occurs after a step has been executed, and operable to variably control the stop-lock energization of said takeup motor as a function of the tape radius at said take-up spool.

6. The combination defined in claim 5 wherein said position servo includes means for comparing said step command and the output of said movement transducer to originate a position error signal, and wherein said stop-lock power supply means is controlled by said position error signal after the execution of the requested step.

7. The combination defined in claim 6 wherein said step modification means is a digital means responsive to said alignment error and operable to compute a delta step correction for a subsequent step command.

8. The combination defined in claim 7 wherein said tape buffer is a vacuum column, wherein said alignment error is operable to effect repositioning of said take-up spool in a manner to reduce said alignment error to zero, and wherein said stop-lock power supply means includes digital means operable to integrate any position error which may occur after the requested step has been executed, the integration thereof being a function of the tape movement necessitated by a change in the tape radius at said take-up spool or a change in vacuum in said column.

9. An incremental magnetic tape unit wherein the tape's magnetic domains are transduced by head means while the tape is at rest and wherein said tape includes position servo data defining a plurality of desired rest positions for said tape, comprising:

a tape transducing station including said head means cooperating with a length of tape, said tape having a plurality of data fields spaced at intervals and having servo data for at least certain of said data fields, a tape buffer cooperating with said length of tape on one side of said station and applying a substantially constant force in a direction to remove tape from said station, a tape reel cooperating with said length of tape on the other side of said station, a motor connected to said reel, a movement transducer connected to be driven by said motor and providing an output indicative of rotational distance moved by said reel, means generating a step command input, a servomechanism operable to energize said motor and responsive to said step command input and to the output of said movement transducer to energize said motor and to thereby move said reel from one rest position to a new rest position in accordance with the magnitude of said step command input, and to thereafter stop-lock energize said motor to maintain said reel at said new rest position, said reel movement resulting in a change in the tape radius at said reel so that the tape moves a distance at least as great as one data field in response to said step command input, alignment detecting means operable after a step has been executed for reading the servo data to detect misalignment of said head means and the data field to be transduced and providing an alignment error signal representing the misalignment and step modifying means controlled by said alignment detecting means and operable to modify the magnitude of a subsequent step command input as a function of said alignment error signal, said modification resulting in reduced misalignment of said head means and the field data after a subsequent step has been executed.

10. A magnetic tape unit as defined in claim 9, including:

motor energizing means controlled by said alignment detecting means and operable to energize said motor in a manner to reduce alignment error between said head means and the tape's servo data.

11. A magnetic tape unit as defined in claim 10, including:

means responsive to completion of the movement of said reel from said one rest position to said new rest position and operable to enable operation of said step modifying means when said reel has assumed said new rest position.

12. A magnetic tape unit as defined in claim 11, including:

stop-lock modifying means operable to modify the magnitude of said stop-lock energization, means responsive to completion of the movement of said reel from said one rest position to said new rest position and operable to enable operation of said stop-lock modifying means when said reel has assumed said new rest position, and means connecting said stop-lock modifying means to be controlled by movement of said reel away from said new rest position, whereby said stop-lock energization is increased as the radius of tape on the reel increases.

13. A magnetic tape unit as defined in claim 12 wherein said stop-lock modifying means functions to integrate the movement of said reel away from said new rest position.

14. A magnetic tape unit as defined in claim 13 wherein said servomechanism includes a DAC whose input is connected to be energized by position error between said step command input and the motor's actual position, and wherein said stop-lock modifying means includes a digital integrator operable to integrate said position error.

15. An incremental tape transport and rotary head magnetic tape unit, comprising:

a tape take-up spool and a motor connected to rotate the same, a tape supply, a rotating head cooperating with a length of tape running between said tape supply and said take-up spool to trace a track across said tape, said tape having a plurality of data tracks spaced at intervals and having servo indicia for at least certain of said tracks, reading means operable to read said servo indicia to identify misalignment of said head trace with said data track, means generating a tape motion command, a tape motion servo controlled by said tape motion command and operable to energize said take-up motor to execute a requested rotation of said tape take-up spool, said rotation resulting in a change in the tape radius at said tape take-up spool so that the tape moves a distance at least as great as one data track in response to said step command, alignment detection means responsive to said reading means and operable to detect misalignment of said head trace and said data track after completion of the requested step and to originate an alignment error signal representing misalignment of said head track and said data track, and tape motion modifying means operable to modify a subsequent tape motion command in accordance with an alignment error which exists after execution of the requested tape motion, said modification resulting in reduced alignment error after the execution of a subsequent tape motion command.

* * * * *